United States Patent
Mason et al.

(10) Patent No.: US 11,323,006 B1
(45) Date of Patent: May 3, 2022

(54) MULTIPLE-DISCHARGE RAIN MANIFOLD FOR ELECTRIC MOTOR COOLING AND RELATED SYSTEM AND METHOD

(71) Applicant: Canoo Technologies Inc., Torrance, CA (US)

(72) Inventors: John Mason; Charles Garmel, Torrance, CA (US); Samuel Anson Jantzi, Redondo Beach, CA (US); Saul Guzman Carranza, Glendale, CA (US); Jackson George Diebel, Hermosa Beach, CA (US); Garrett Thomas Allen, Los Angeles, CA (US); Evan J. Filter, Newtown Square, PA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 17/491,154

(22) Filed: Sep. 30, 2021

Related U.S. Application Data

(63) Continuation of application No. 17/305,142, filed on Jun. 30, 2021.

(51) Int. Cl.
  *H02K 5/20* (2006.01)
  *H02K 7/00* (2006.01)
  *B60K 1/00* (2006.01)

(52) U.S. Cl.
  CPC ............. *H02K 5/203* (2021.01); *H02K 7/006* (2013.01); *B60K 2001/006* (2013.01)

(58) Field of Classification Search
  CPC ... H02K 5/203; H02K 7/006; B60K 2001/006

USPC .......................................................... 310/52
  See application file for complete search history.

(56) References Cited

U.S. PATENT DOCUMENTS

| | | | | |
|---|---|---|---|---|
| 2003/0155314 A1* | 8/2003 | Gordon | ................... | B01D 35/02 |
| | | | | 210/791 |
| 2005/0241282 A1* | 11/2005 | Gordon | .............. | B01D 46/0071 |
| | | | | 55/302 |
| 2012/0174539 A1* | 7/2012 | Tornblom | ............... | B04B 11/02 |
| | | | | 55/409 |
| 2015/0222162 A1* | 8/2015 | Pinkley | .................... | H02K 9/00 |
| | | | | 310/54 |
| 2016/0233744 A1* | 8/2016 | Kaneshige | ............... | H02K 9/19 |
| 2019/0193775 A1* | 6/2019 | Hamada | ................. | B62D 5/046 |
| 2020/0036264 A1* | 1/2020 | Lin | ......................... | H02K 9/19 |
| 2020/0166026 A1* | 5/2020 | Marica | .................... | F04B 1/146 |
| 2021/0167666 A1* | 6/2021 | Deguchi | .................. | H02K 1/32 |
| 2021/0175779 A1* | 6/2021 | Kim | ....................... | H02K 5/203 |

* cited by examiner

*Primary Examiner* — Alex W Mok

(57) ABSTRACT

An apparatus includes a housing configured to receive at least a portion of an electric motor. The apparatus also includes a manifold disposed on an upper surface of the housing. The manifold includes a number of vertical jets configured to target one or more portions of the electric motor, the vertical jets includes multiple vias extending between (i) a cavity within the manifold and (ii) an interior portion of the housing. The cavity within the manifold is defined by (i) at least a portion of the upper surface of the housing, (ii) one or more side walls extending from the upper surface of the housing, and (iii) a cover lid coupled to the one or more side walls and configured to cover the cavity and the vias.

22 Claims, 9 Drawing Sheets

MULTIPLE-DISCHARGE RAIN MANIFOLD FOR ELECTRIC MOTOR COOLING AND RELATED SYSTEM AND METHOD

CROSS-REFERENCE TO RELATED APPLICATION AND PRIORITY CLAIM

This application claims priority under 35 U.S.C. § 120 as a continuation of U.S. patent application Ser. No. 17/305,142 filed on Jun. 30, 2021, which is hereby incorporated by reference in its entirety.

TECHNICAL FIELD

This disclosure relates generally to electric vehicles. More specifically, this disclosure relates to a multiple-discharge rain manifold for electric motor cooling and related system and method.

BACKGROUND

Traditionally, automobiles have required the use of petroleum-based fuels, such as gasoline or diesel fuel, to operate via ignition in an internal combustion engine. Recently, due to ecological concerns and concerns over gasoline prices or shortages, many consumers and commercial operators have sought vehicles that operate on alternate power sources, such as electricity. Electric vehicles now represent a growing market and are expected to surpass internal combustion engine vehicle sales within the next five to ten years. An electric vehicle includes an electric motor that operates based on input electrical power, which is defined by an electrical voltage and an electrical current. Although electric motors are very efficient by design, the electric motors are not 100% efficient. Unfortunately, due to inherent losses in materials and other factors, a portion of the input power results in heating of the electric motor. If the heat is not properly removed, a temperature of the motor can become excessive, resulting in damage to or failure of the electric motor.

SUMMARY

This disclosure provides a multiple-discharge rain manifold for electric motor cooling and related system and method.

In a first embodiment, an apparatus includes a housing configured to receive at least a portion of an electric motor. The apparatus also includes a manifold disposed on an upper surface of the housing. The manifold further includes a number of vertical jets configured to target one or more portions of the electric motor. The vertical jets include multiple vias extending between (i) a cavity within the manifold and (ii) an interior portion of the housing. The cavity within the manifold is defined by (i) at least a portion of the upper surface of the housing, (ii) one or more side walls extending from the upper surface of the housing, and (iii) a cover lid coupled to the one or more side walls and configured to cover the cavity and the vias.

In a second embodiment, a system includes a power source and an electric motor electrically coupled to the power source. The electric motor includes a housing and a manifold disposed on an upper surface of the housing. The manifold includes a number of vertical jets configured to target one or more portions of the electric motor. The vertical jets include multiple vias extending between (i) a cavity within the manifold and (ii) an interior portion of the housing. The cavity within the manifold is defined by (i) at least a portion of the upper surface of the housing, (ii) one or more side walls extending from the upper surface of the housing, and (iii) a cover lid coupled to the one or more side walls and configured to cover the cavity and the vias.

In a third embodiment, a method includes forming a housing configured to receive at least a portion of an electric motor. The housing includes at least one channel on an upper surface of the housing, where the at least one channel is defined by one or more side walls extending from the upper surface of the housing. The method also includes forming jets, each of the jets including a via extending between (i) the at least one channel and (ii) an interior portion of the housing. The method further includes coupling a cover lid to the one or more side walls to form a manifold on the upper surface of the housing.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
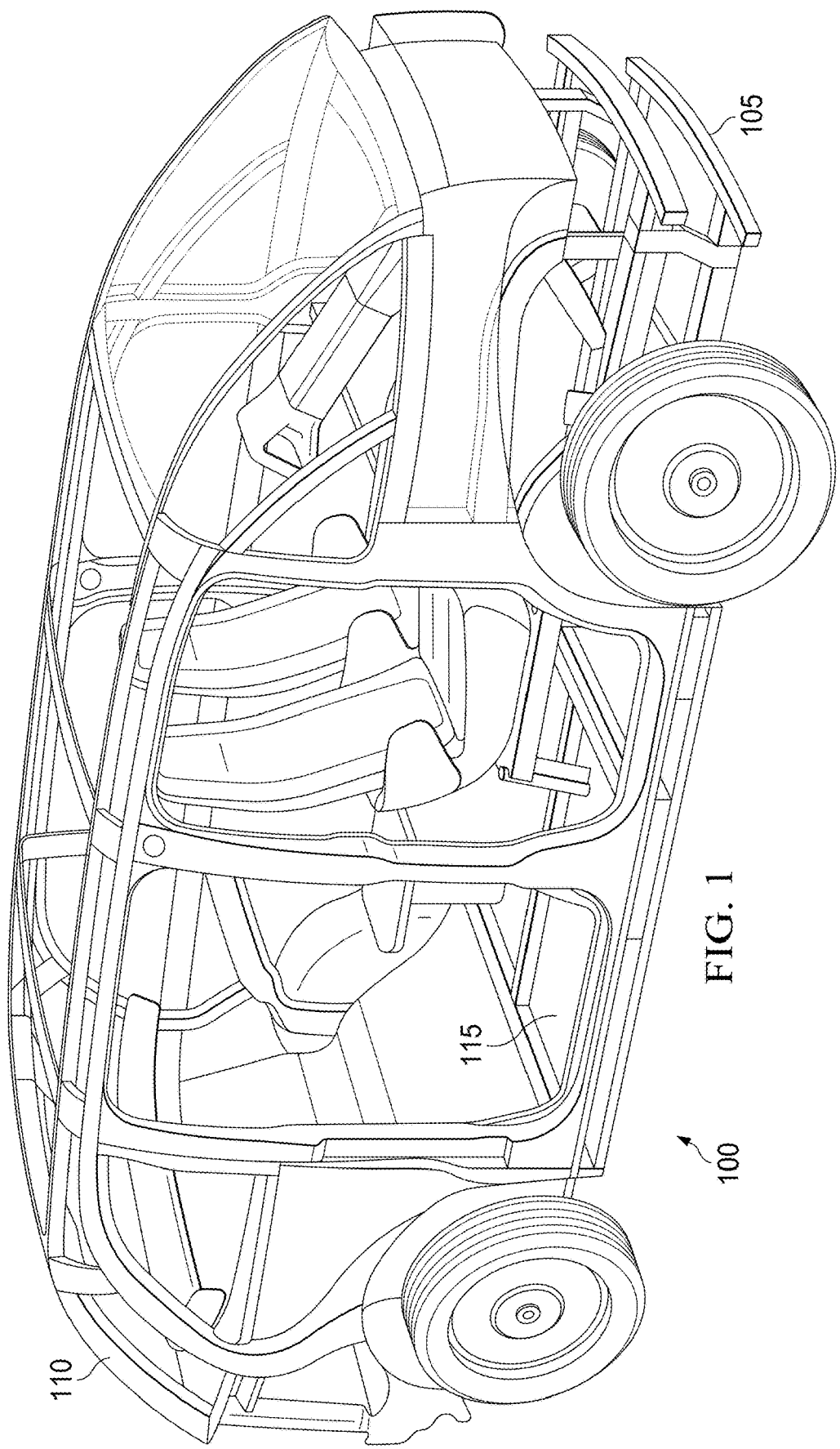
FIG. 1 illustrates an example electric vehicle according to embodiments of this disclosure.

FIGS. 1 through 7, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, an electric vehicle includes an electric motor that operates based on input electrical power, which is defined by an electrical voltage and an electrical current. Although electric motors are very efficient by design, the electric motors are not 100% efficient. Unfortunately, due to inherent losses in materials and other factors, a portion of the input power results in heating of the electric motor. If the heat is not properly removed, a temperature of the motor can become excessive, resulting in damage to or failure of the electric motor. In some cases, for example, end turn windings of an electric motor are one place where a coolant fluid, such as an oil product, might be introduced in order to extract heat from the electric motor. However, introducing a coolant fluid to an electric motor is often difficult and can suffer from various problems. As a particular example, when an electric motor is round, the coolant fluid may not be evenly distributed, which can allow individual hot spots to form and damage to occur. Additionally, to deliver a coolant to respective portions of the electric motor, holes must be drilled through a manifold and housing of the electric motor after the manifold has been coupled to the housing. As a result, caps or freeze plugs must be placed on the manifold over each hole to seal the manifold.

This disclosure describes various embodiments of a multiple-discharge rain manifold for electric motor cooling and related system and method. As described in more detail below, a housing is configured to receive at least a portion of an electric motor, and a manifold is disposed on an upper surface of the housing. Multiple vias extend between a cavity within the manifold and an interior portion of the housing. The cavity within the manifold is defined by at least a portion of the upper surface of the housing, one or more side walls extending from the upper surface of the housing, and a cover lid coupled to the one or more side walls and configured to cover the cavity and the vias.

In some embodiments, the manifold can be positioned above a stator or other portion(s) of an electric motor to be cooled, and the vias can be used to create a "rainfall" pattern of coolant fluid over the portion(s) of the electric motor to be cooled. Each of the vias may have any suitable size and shape, and different vias may have common or different sizes and shapes. Also, the vias may have any suitable arrangement relative to the portion(s) of the electric motor to be cooled. These features of the vias can be adjusted as needed or desired to create a desired flow pattern and to provide the desired amount(s) of coolant fluid to the portion(s) of the electric motor to be cooled. In particular embodiments, a low-pressure system may create vertical jets of coolant fluid to target and hit one or more zones of the electric motor independent of pump flow and pressure. Various approaches for forming these types of structures, such as through the use of casting and friction stir welding, are also described.

The embodiments of the multiple-discharge rain manifold may provide various benefits or advantages depending on the implementation. For example, the design of the vias can be easily modified in order to provide desired amounts of coolant fluid to desired areas of an electric motor. Also, the multiple-discharge rain manifold can provide for a more even distribution of a coolant fluid over an electric motor, which can help to improve motor cooling and lead to increased performance and motor life.

FIG. 1 illustrates an example electric vehicle 100 according to embodiments of this disclosure. As shown in FIG. 1, the vehicle 100 includes a vehicle platform 105, a vehicle body 110, and one or more energy storage elements 115. The vehicle platform 105 represents a structure on or to which other components, such as the vehicle body 110, of the vehicle 100 can be mounted. The vehicle platform 105 is commonly referred to as a "skateboard." The vehicle body 110 represents a structure that defines a passenger compartment, cargo compartment, or other features of the electric vehicle 100 within the vehicle body 110. The one or more energy storage elements 115 provide input electrical power used by an electric motor of the electric vehicle 100. The one or more energy storage elements 115 represent any suitable source(s) of electrical power, such as one or more batteries. In some cases, the vehicle platform 105 is designed to keep its construction as simple and flexible as possible so that many vehicles can be designed and built on the same vehicle platform 105, such as by allowing different vehicle bodies 110 to be attached to the same vehicle platform 105.

As described in more detail below, the electric vehicle 100 includes at least one instance of a multiple-discharge rain manifold, which is used for cooling the electric motor of the electric vehicle 100. For example, the manifold can be designed to include or be used in conjunction with multiple vias extending between a cavity within the manifold and an interior portion of a housing, where the housing contains at least a portion of the electric motor. The vias can be used to create a "rainfall" pattern of coolant fluid on one or more areas of the electric motor to be cooled.

Although FIG. 1 illustrates one example of an electric vehicle 100, various changes may be made to FIG. 1. For example, the actual form of the electric vehicle 100 in which one or more multiple-discharge rain manifolds are used can vary as needed or desired. While FIG. 1 illustrates one example environment in which a multiple-discharge rain manifold can be used, the multiple-discharge rain manifolds described in this disclosure may be used with any other suitable motors or vehicles.

Figure 2:
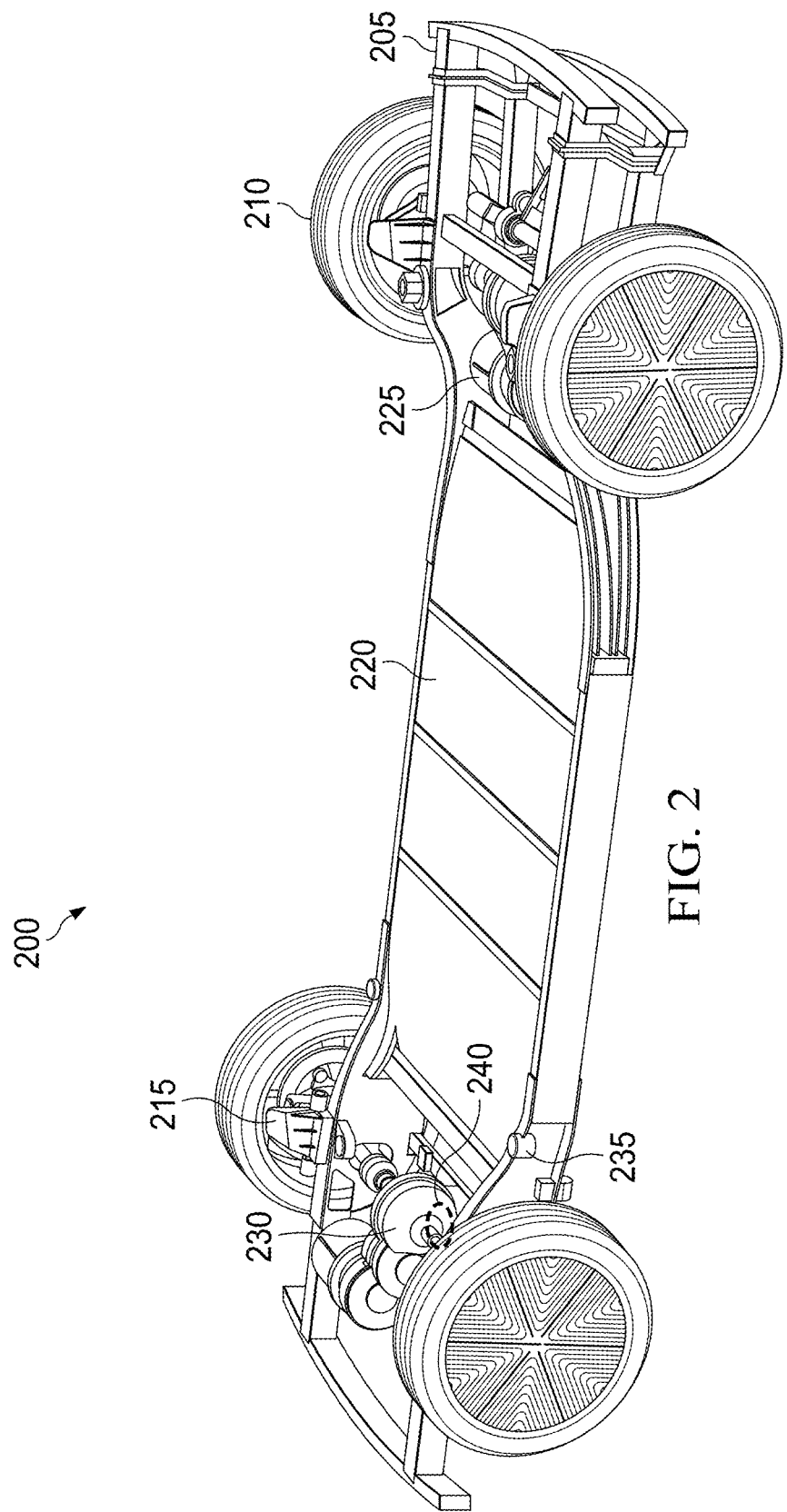
FIG. 2 illustrates an example electric vehicle platform according to embodiments of this disclosure.

FIG. 2 illustrates an example electric vehicle platform 200 according to embodiments of this disclosure. The vehicle platform 200 may, for example, represent the vehicle platform 105 shown in FIG. 1 and described above. For ease of explanation, the vehicle platform 200 is described as being used in the electric vehicle 100 of FIG. 1. However, the vehicle platform 200 may be used with any other suitable vehicle.

As shown in FIG. 2, the vehicle platform 200 includes a frame structure 205, which generally represents a structure on or to which other components of the vehicle platform 200 are mounted. These other components may include wheels 210, suspension systems 215, and a battery pack 220. The battery pack 220 may represent or include the one or more energy storage elements 115 described above. These other components may also include a front drive train 225 and a rear drive train 230. Each of the drive trains 225 and 230 can include, for example, an electric motor and any associated power electronics, transmission, and related components. As described in more detail below, each electric motor may be used with a multiple-discharge rain manifold and pump system 240 having a pump and coolant, which can be used to cool the electric motor.

As shown in this particular example, each drive train 225 and 230 may be respectively positioned in-line with the wheels 210 in front and back of the vehicle platform 200. Thus, the front drive train 225 can be located between the front wheels 210 and coupled to a front axle (such as through a gear box and/or a differential), and the rear drive train 230 can be located between the rear wheels 210 and coupled to a rear axle (such as through a gear box and/or a differential). Note, however, that other arrangements may be used in the vehicle platform 200, such as when each wheel 210 has an associated electric motor and related components. Also note that a number of other systems, such as brakes, comfort control systems, and other components may be coupled to the vehicle platform 200.

Various attachment points 235 are provided on the vehicle platform 200. The attachment points 235 represent locations where a vehicle body (such as the vehicle body 110) can be attached to the vehicle platform 200. In some embodiments, the attachment points 235 may allow vehicle bodies of varying designs to be coupled to the vehicle platform 200.

Although FIG. 2 illustrates one example of an electric vehicle platform 200, various changes may be made to FIG.

2. For example, the vehicle platform 200 could include any number of components in any suitable arrangement. In general, vehicle platforms can come in a wide variety of configurations, and FIG. 2 does not limit the scope of this disclosure to any particular configuration. Also, the actual form of the vehicle platform 200 in which one or more multiple-discharge rain manifolds are used can vary as needed or desired. While FIG. 2 illustrates one example vehicle platform in which a multiple-discharge rain manifold can be used, the multiple-discharge rain manifolds described in this disclosure may be used with any other suitable vehicle platforms.

Figure 3:
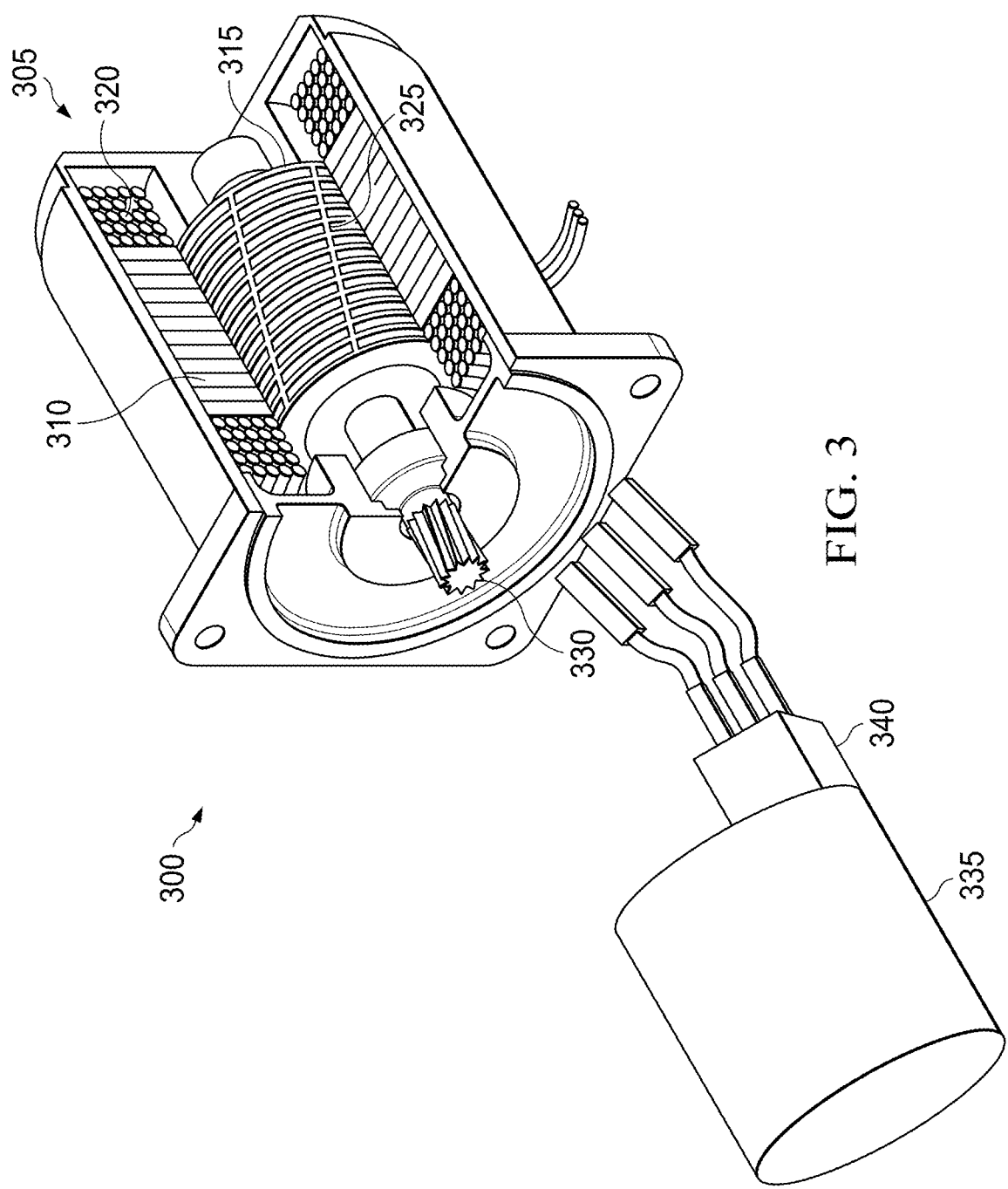
FIG. 3 illustrates an example electric drive train according to embodiments of this disclosure.

FIG. 3 illustrates an example electric drive train 300 according to embodiments of this disclosure. The drive train 300 may, for example, represent the front drive train 225 or the rear drive train 230 of the vehicle platform 200 shown in FIG. 2 and described above. For ease of explanation, the drive train 300 is described as being used in the vehicle platform 200 and in the electric vehicle 100 of FIG. 1. However, the drive train 300 may be used with any other suitable platform and with any other suitable vehicle.

As shown in FIG. 3, the drive train 300 includes an electric induction motor 305, which here is configured to receive three-phase (3ϕ) input electrical power. As described in more detail below, the electric motor 305 may be used with a multiple-discharge rain manifold, which can be used to cool the electric motor 305. The electric induction motor 305 is shown in FIG. 3 with a portion removed for ease of explanation. The electric induction motor 305 includes a stator 310 and a rotor 315. The stator 310 includes a plurality of conductive windings or coils 320, which may be formed using any suitable conductive metal(s) or other conductive material(s) (such as copper). The rotor 315 includes a collection of conducting bars 325 that are short-circuited by end rings and includes a drive wheel 330. The three-phase input power is provided to the stator 310 and travels through the windings or coils 320, which produces a rotating magnetic field (such as a four-pole magnetic field). The rotating magnetic field induces a current through the conducting bars 325 of the rotor 315, which makes the rotor 315 and the drive wheel 330 turn.

In this example, the three-phase input power is provided from the battery pack 220 or other energy storage element(s) 115 through a power inverter 335, which is configured to receive direct current (DC) power and generate the three-phase input power for the motor 305. The power inverter 335 may include a variable frequency drive 340 to control a frequency of the three-phase input power. Note, however, that the motor 305 may be powered in any other suitable manner.

Although FIG. 3 illustrates one example of an electric drive train 300, various changes may be made to FIG. 3. For example, the drive train 300 may include an internal permanent magnet (IPM) motor or other form of electric motor instead of the electric induction motor 305. In certain embodiments, the electric motor comprises one of: coil windings, hairpin windings, or bar-wound windings. For instance, the electric motor can include hairpin wire that is shaped into a "hairpin" before it is inserted into the stator core slot. Thus, the actual form of the electric motor 305 that can be cooled using one or more multiple-discharge rain manifolds can vary as needed or desired. While FIG. 3 illustrates one example drive train 300 in which a specific electric motor 305 may be cooled using a multiple-discharge rain manifold, the multiple-discharge rain manifolds described in this disclosure may be used with any other suitable drive trains or motors.

FIGS. 4A through 4D illustrate an example raindrop manifold 400 for an electric motor according to embodiments of this disclosure. For ease of explanation, the raindrop manifold 400 is described as being used with the electric motor 305 in the drive train 300 within the vehicle platform 200 and in the electric vehicle 100 of FIG. 1. However, the raindrop manifold 400 may be used with any other suitable motor, drive train, platform, and vehicle.

Figure 4A:
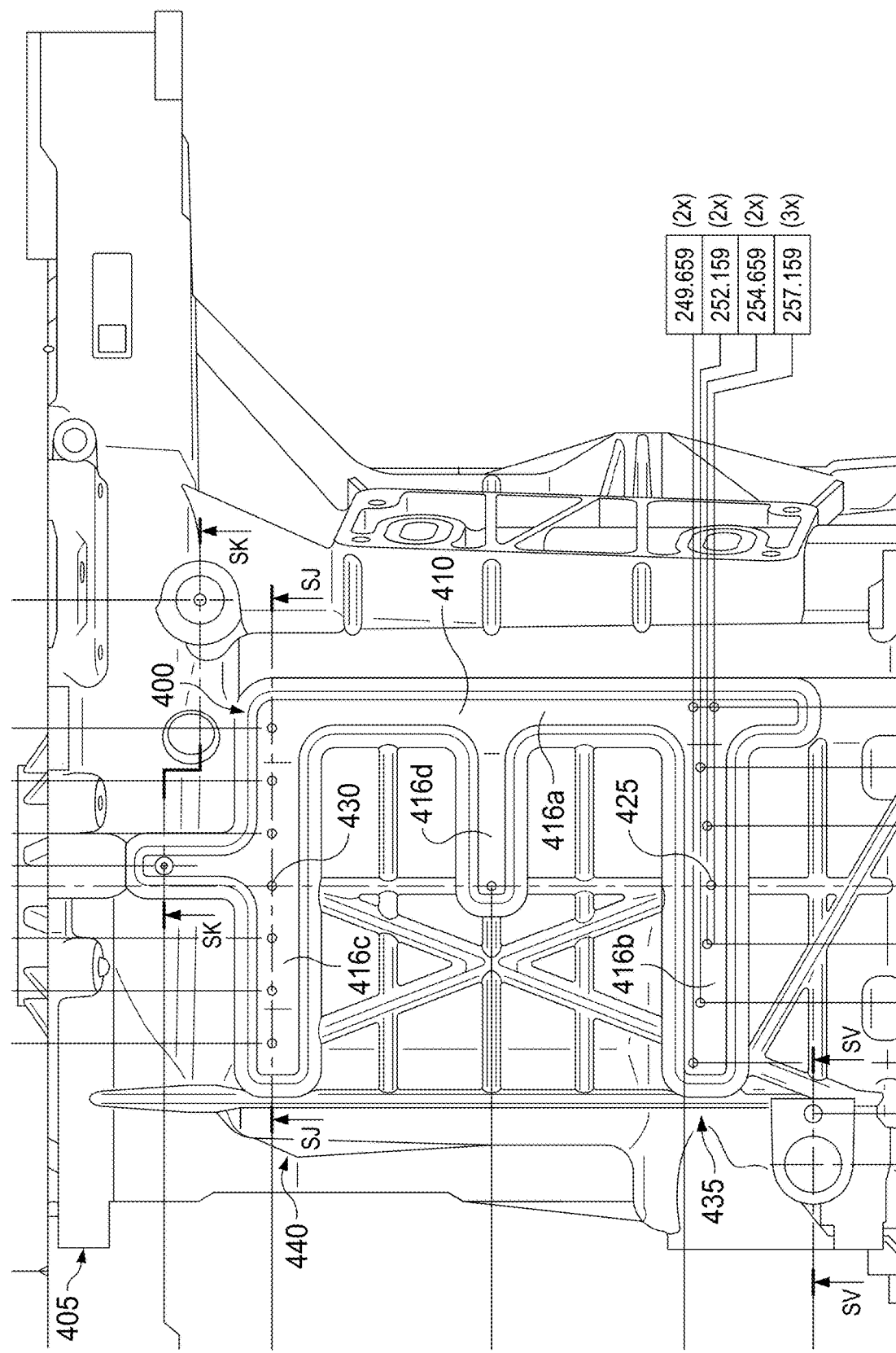
FIGS. 4A through 4D illustrate an example raindrop manifold for an electric motor according to embodiments of this disclosure.
Figure 4B:
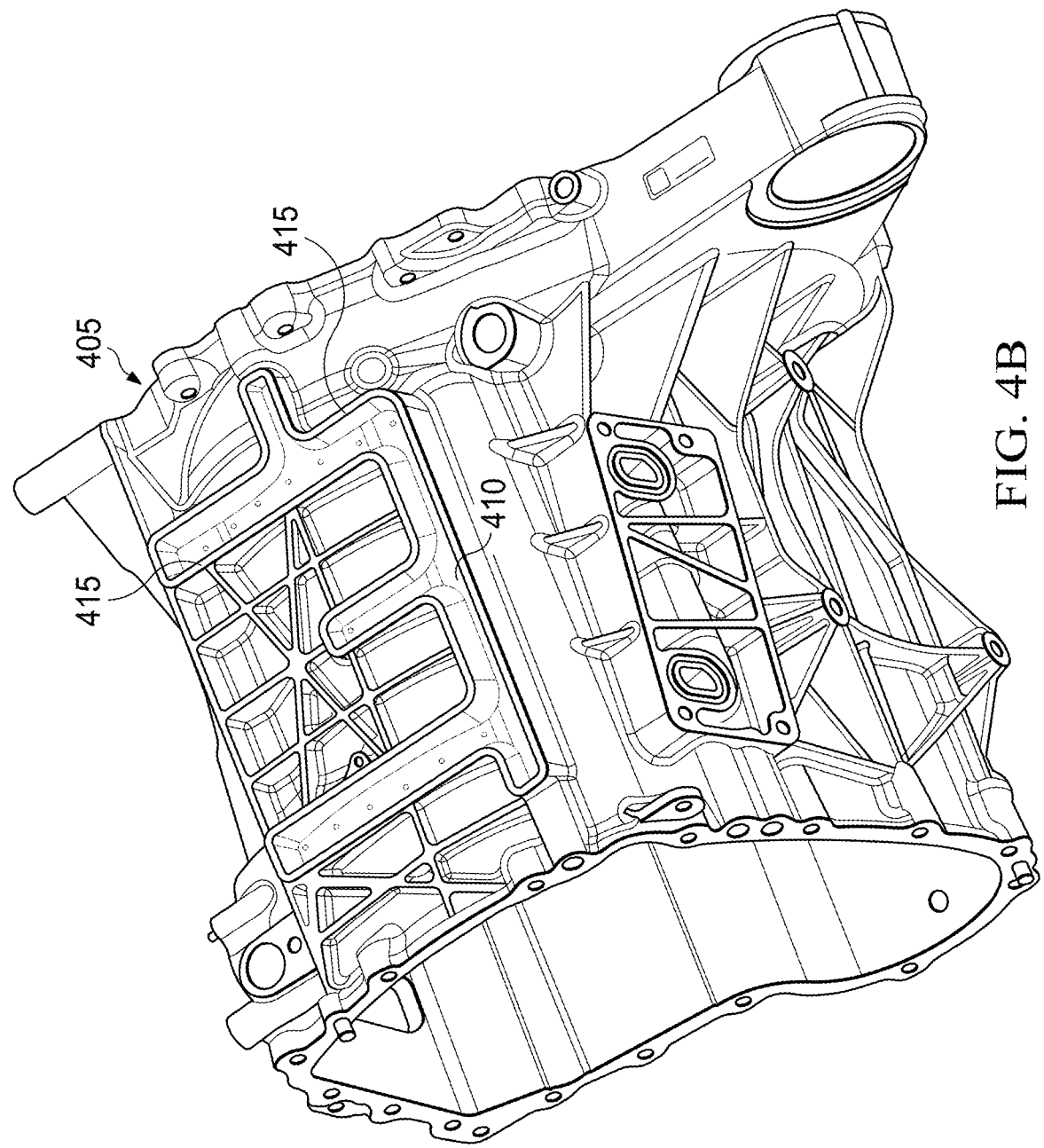
Figure 4C:
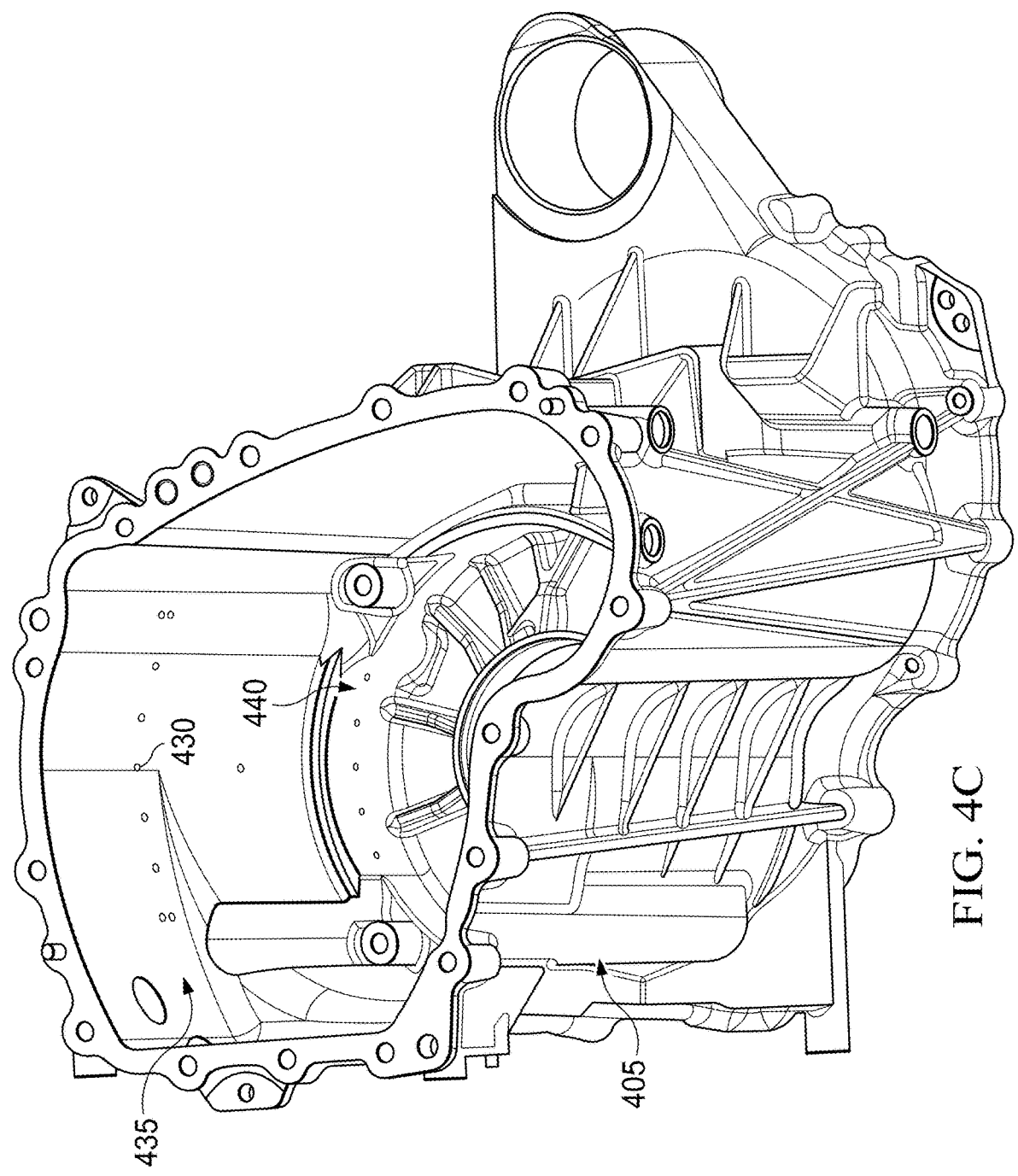
Figure 4D:
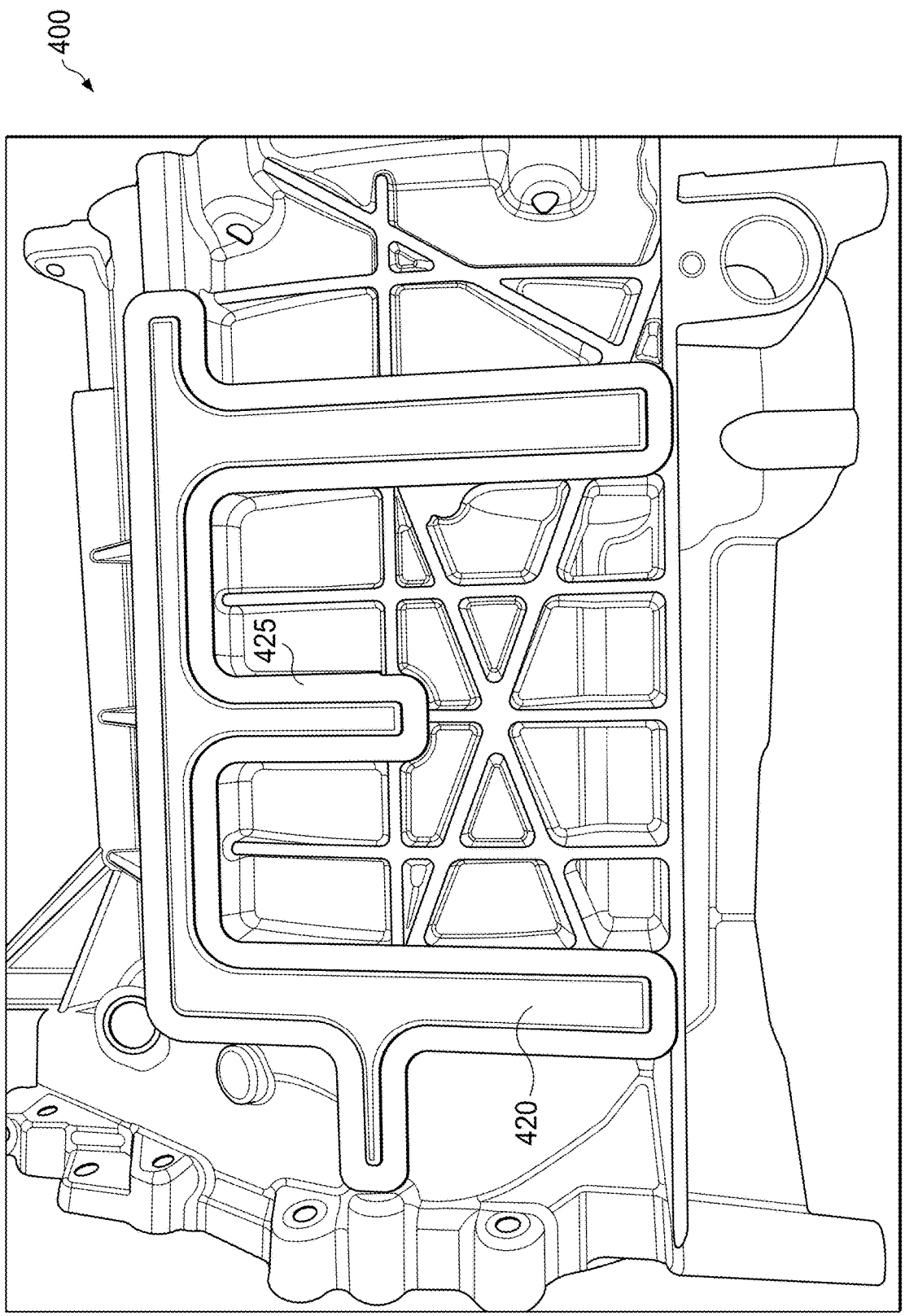

As shown here, FIG. 4A illustrates a top view of the raindrop manifold 400, FIG. 4B illustrates an isometric view of the raindrop manifold 400, FIG. 4C illustrates an interior view of a housing 405 having the raindrop manifold 400, and FIG. 4D illustrates the raindrop manifold 400 with a cover lid 420. In this example, the housing 405 represents a housing for an electric motor, such as the electric motor 305. The housing 405 is configured to receive at least a portion of the electric motor 305 into an interior of the housing 405.

The raindrop manifold 400 is formed in an upper surface of the housing 405 and includes a cavity 410 having one or more side walls 415. The cavity 410 includes elongated fluid channels, including a first channel 416a and second, third, and fourth channels 416b-416d extending from the first channel 416a. A bottom surface of the cavity 410 includes at least a portion of a top surface of the housing 405. The cavity 410 defines a path or passage for a coolant fluid to flow through the raindrop manifold 400. In some embodiments, the cavity 410 includes or is covered by the cover lid 420 to completely form an enclosed cavity 410. In particular embodiments, the cover lid 420 may be permanently affixed to the one or more side walls 415, such as by a friction stir welded 425, to permanently seal the manifold cavity 410 without fasteners or sealant.

The raindrop manifold 400 includes a plurality of vias 430, including multiple vias 430 extending from the second channel 416b, multiple vias 430 extending from the third channel 416c, and at least one via 430 extending from the fourth channel 416d. Each of the vias 430 is formed as a hole that extends between the cavity 410 of the raindrop manifold 400 and an interior portion of the housing 405. The vias 430 therefore enable the coolant fluid to drop, through gravity, onto the electric motor (or portion thereof) within the housing 405. For example, the vias 430 may be positioned to be vertically above one or more portions of the stator 310 or other portion of the electric motor, and the coolant fluid can flow through the vias 430 onto targeted portions of the stator 310 or other portion of the electric motor.

The pressure of the coolant fluid in the cavity 410 affects how much of the coolant fluid flows through the vias 430 and onto the electric motor. In some cases, however, the coolant fluid may contact the same targeted portions of the stator 310 or other portion of the electric motor to be cooled regardless of the pressure. For example, at lower pressures, the coolant fluid may flow through the vias 430 and drip or form lower-velocity streams onto the electric motor. At higher pressures, the coolant fluid may flow through the vias 430 and form higher-velocity streams of fluid that contact the electric motor. In either case, the coolant fluid can still hit the same portions of the electric motor, which is a result of the vertical positioning and orientation of the vias 430 over the electric motor.

The housing 405 and raindrop manifold 400 may each be formed from any suitable material(s), such as one or more metals. The housing 405 and raindrop manifold 400 may also each be formed using any suitable fabrication technique, such as injection molding, machining, casting, or additive manufacturing. In addition, the housing 405 and raindrop manifold 400 may each have any suitable size, shape, and dimensions. In some embodiments, the one or more side walls 415 of the raindrop manifold 400 can be integral with the housing 405. The vias 430 may be formed in any suitable manner, such as by mechanical or laser drilling of holes in specified locations or by forming the raindrop manifold 400 to include pre-formed vias 430. Note that the cover lid 420 can be configured to cover all of the vias 430 without the need for individual caps, freeze plugs, or other structures. Thus, any number of vias 430 in any number of configurations or patterns can be formed in the raindrop manifold 400 without changing the configuration of the cover lid 420.

The vias 430 here can be spaced apart to create a "rainfall" pattern of coolant fluid, such as over the windings or other portions of an electric motor. This type of pattern can provide an enhanced or more even distribution of coolant fluid over the portions of the electric motor to be cooled. The arrangement of vias 430 can vary depending on the design of the electric motor or other factors. In some cases, the vias 430 can be arranged in a straight line. In other cases, the vias 430 can be arranged to support cooling at targeted locations of an electric motor. A combination of some vias 430 in a straight line and other vias 430 in a non-linear pattern may also be used. As a particular example, in some embodiments, the raindrop manifold 400 may include a combination of an "M"-shaped pattern 435 of vias 430 on one side of the electric motor and a straight pattern 440 of vias 430 on the other side of the electric motor, such as to provide better fluid distribution for a stator having asymmetry in its windings. Note, however, that the flow of coolant fluid can vary as the motor design changes, such as to optimize the flow of coolant fluid onto the stator windings based on hole sizes, spacings, patterns, or other characteristics of the vias 430.

Although FIGS. 4A through 4D illustrate one example of a raindrop manifold 400 for an electric motor, various changes may be made to FIGS. 4A through 4D. For example, the forms of the raindrop manifold 400 and the housing 405 may vary from the forms shown here. Also, any number of vias 430 in any desired arrangement may be used to support cooling of an electric motor.

Figure 5A:
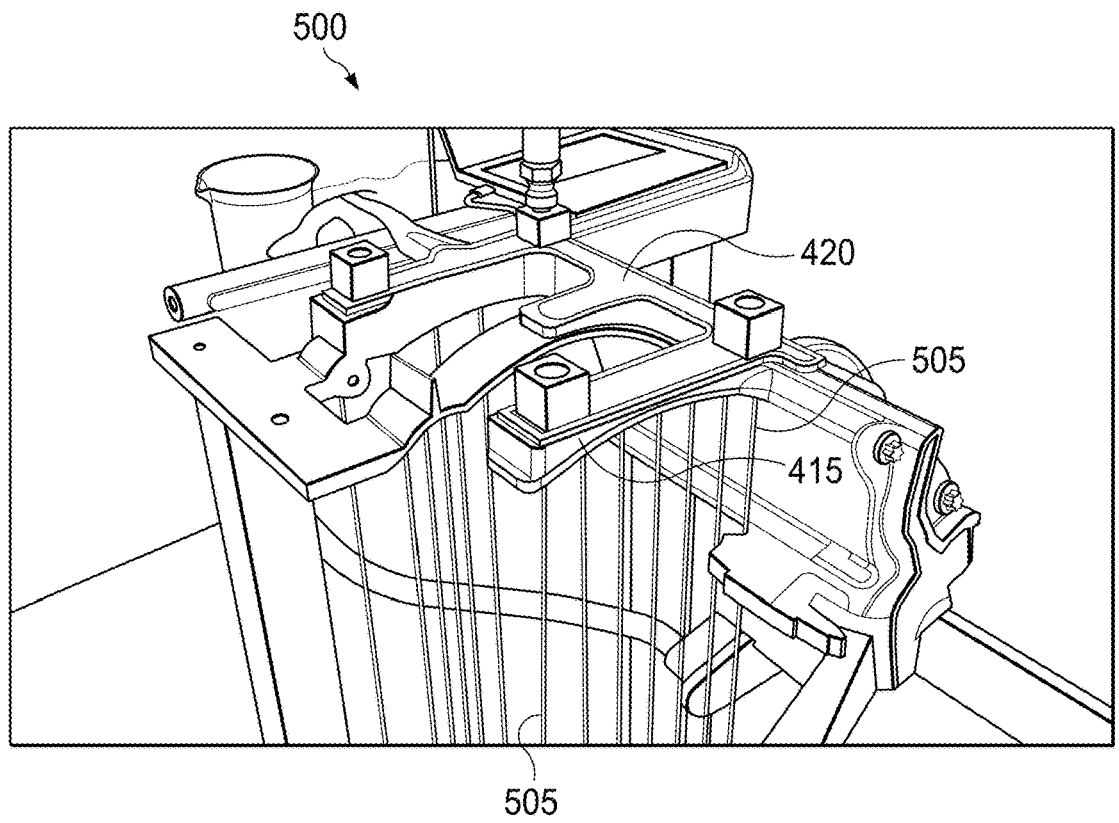
FIGS. 5A and 5B illustrate an example fluid flow from a raindrop manifold according to embodiments of this disclosure.
Figure 5B:
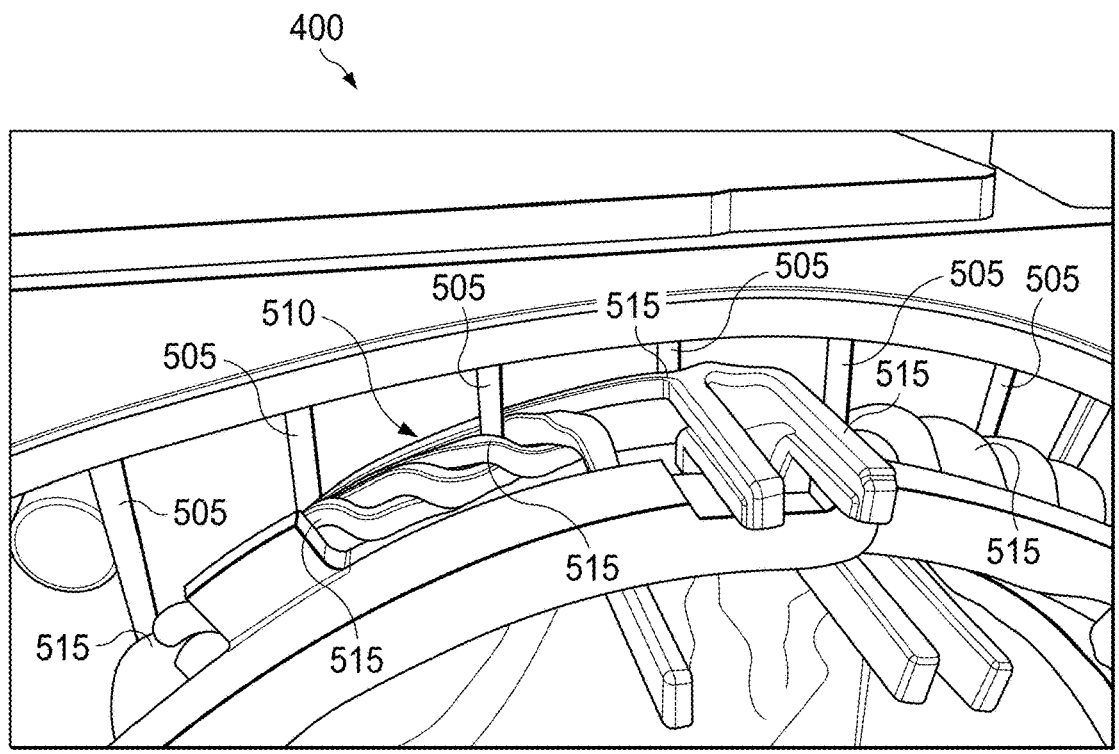

FIGS. 5A and 5B illustrate an example fluid flow from the raindrop manifold 400 according to embodiments of this disclosure. As shown in FIG. 5A, the raindrop manifold 400 is depicted without the housing 405 to illustrate its operation and fluid flow. The raindrop manifold 400 here includes the cover lid 420 and one or more side walls 415 that, together with a bottom surface (such as at least part of the top surface of housing 405), define the cavity 410. The raindrop manifold 400 receives a coolant fluid from a pump system, and the coolant fluid traverses the cavity 410 within the raindrop manifold 400 and drops downward as vertical streams 505. As shown in FIG. 5B, the raindrop manifold 400 here is depicted with the housing 405. The vertical streams 505 here can be seen to fall towards targeted locations 515 of the stator of an electric motor.

Although FIGS. 5A and 5B illustrate examples of fluid flow from the raindrop manifold 400, various changes may be made to FIGS. 5A and 5B. For example, the number of streams 505 and targeted locations 515 here are for illustration only.

Figure 6:
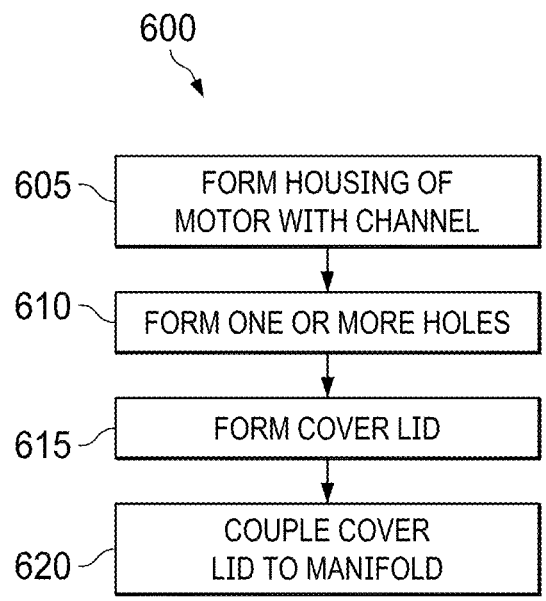
FIG. 6 illustrates an example process for forming a raindrop manifold according to embodiments of this disclosure.

FIG. 6 illustrates an example process 600 for forming a raindrop manifold according to embodiments of this disclosure. For ease of explanation, the process 600 is described as being used to form the raindrop manifold 400. However, the process 600 may be used to form any other suitable raindrop manifold designed in accordance with the teachings of this disclosure.

As shown in FIG. 6, in operation 605, a housing 405 for an electric motor is cast or otherwise formed. The housing 405 can be formed to include at least one channel (which partially defines at least one cavity 410) on an upper surface of the housing. Each channel may be defined by a bottom surface formed by at least part of the upper surface of the housing 405. Each channel may be further defined by one or more side walls 415 extending upward or away from the surface of the housing 405. The channel(s) can be designed with a pattern configured to dispose the channel(s) over one or more targeted portions of a stator or other portion(s) of an electric motor to be cooled.

In operation 610, one or more vias 430 are machined or otherwise formed in the bottom surface of the channel(s). The one or more vias 430 extend from the channel(s) to an interior of the housing 405. The vias 430 can be spaced apart to create a "rainfall" pattern of coolant fluid over the stator and its windings or other portion(s) of the electric motor to be cooled. The vias 430 can be formed in specified locations or in one or more specified patterns (or both) within the channel(s) to direct flows of the coolant fluid to targeted portions of the electric motor to be cooled. The vias 430 can be formed in different configurations and different sizes to vary the coolant fluid flow pattern and amount.

In operation 615, a cover lid 420 is machined or otherwise formed. The cover lid 420 can be dimensioned to cover the channel(s) and form at least one cavity 410 within a manifold 400 formed on the upper surface of the housing 405. In operation 620, the cover lid 420 is friction stir welded or otherwise coupled to the one or more side walls 415 of the channel(s) to permanently seal the manifold cavity without fasteners or sealant.

Although FIG. 6 illustrates one example of a process 600 for forming a raindrop manifold 400, various changes may be made to FIG. 6. For example, while shown as a series of steps, various steps in FIG. 6 may overlap, occur in parallel, occur in a different order, or occur any number of times.

Figure 7:
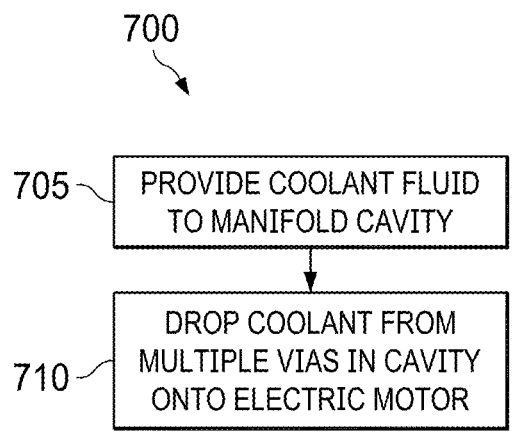
FIG. 7 illustrates an example process for delivering coolant fluid to an electric motor via a raindrop manifold according to embodiments of this disclosure.

FIG. 7 illustrates an example process 700 for delivering coolant fluid to an electric motor via a raindrop manifold according to embodiments of this disclosure. For ease of explanation, the process 700 is described as being performed using the raindrop manifold 400. However, the process 700 may be performed using any other suitable raindrop manifold designed in accordance with the teachings of this disclosure.

As shown in FIG. 7, in operation 705, a coolant fluid is provided to a cavity 410 of a manifold 400. The coolant fluid can be any suitable coolant, such as an oil, that has sufficient insulation and heat conductivity properties to efficiently draw heat away from one or more portions of an electric motor. The coolant fluid can be provided through a coolant system coupled to the manifold cavity 410, such as a coolant system that includes a pump configured to pressurize the coolant fluid within the coolant system. For example, when the electric motor is being operated in conditions in which the electric motor is expected to generate more heat, the pump can be configured to increase pressure in the coolant system in order to increase a flow and amount of the coolant fluid into the manifold cavity 410. When the electric motor is being operated in conditions in which the electric motor is expected to generate less heat, the pump can be configured to decrease pressure in the coolant system in order to decrease a flow and amount of coolant fluid into the manifold cavity 410.

In operation 710, the manifold cavity 410 provides passage of the coolant fluid to various portions of the electric motor. For example, the cavity 410 can provide the coolant fluid to the vias 430, and the coolant fluid can flow through the vias 430 and into an interior of the housing 405. The coolant fluid can then drop towards the targeted areas of the electric motor.

Although FIG. 7 illustrates one example of a process 700 for delivering coolant fluid to an electric motor via a raindrop manifold 400, various changes may be made to FIG. 7. For example, while shown as a series of steps, the steps in FIG. 7 may overlap, occur in parallel, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a housing configured to receive at least a portion of an electric motor; and
a manifold disposed on an upper surface of the housing, the manifold comprising a number of vertical jets configured to target one or more portions of the electric motor, the vertical jets comprising multiple vias extending between (i) a cavity within the manifold and (ii) an interior portion of the housing;
wherein the cavity within the manifold is defined by:
at least a portion of the upper surface of the housing;
one or more side walls extending from the upper surface of the housing; and
a cover lid coupled to the one or more side walls and configured to cover the cavity and the vias;
wherein the cavity includes multiple elongated fluid channels including (i) a first elongated fluid channel and (ii) second and third elongated fluid channels extending from the first elongated fluid channel and fluidly coupled to the first elongated fluid channel; and
wherein the vias include (i) multiple first vias extending from the second elongated fluid channel and (ii) multiple second vias extending from the third elongated fluid channel.

2. The apparatus of claim 1, wherein the one or more side walls are integral with the housing.

3. The apparatus of claim 1, wherein the cover lid is permanently affixed to the one or more side walls.

4. The apparatus of claim 1, wherein the vias are positioned to permit a coolant fluid to exit the cavity and strike the one or more targeted portions of the electric motor.

5. The apparatus of claim 1, wherein the vias are configured to permit a coolant fluid to exit the cavity and strike the one or more targeted portions of the electric motor regardless of a fluid pressure within the cavity.

6. The apparatus of claim 1, wherein the vias are patterned in at least one of:
multiple straight lines; and
an "M"-shaped pattern.

7. The apparatus of claim 1, wherein:
the multiple elongated fluid channels further include a fourth elongated fluid channel extending from the first elongated fluid channel and fluidly coupled to the first elongated fluid channel; and
the vias further include at least one third via extending from the fourth elongated fluid channel.

8. The apparatus of claim 7, wherein:
the first, second, third, and fourth elongated fluid channels are each substantially linear;
the second, third, and fourth elongated fluid channels extend substantially perpendicular from the first elongated fluid channel from a common side of the first elongated fluid channel; and
the second, third, and fourth elongated fluid channels are substantially parallel with one another.

9. A system comprising:
a power source; and
an electric motor electrically coupled to the power source;
wherein the electric motor comprises:
a housing; and
a manifold disposed on an upper surface of the housing, the manifold comprising a number of vertical jets configured to target one or more portions of the electric motor, the vertical jets comprising multiple vias extending between (i) a cavity within the manifold and (ii) an interior portion of the housing;
wherein the cavity within the manifold is defined by:
at least a portion of the upper surface of the housing;
one or more side walls extending from the upper surface of the housing; and
a cover lid coupled to the one or more side walls and configured to cover the cavity and the vias;
wherein the cavity includes multiple elongated fluid channels including (i) a first elongated fluid channel and (ii) second and third elongated fluid channels extending from the first elongated fluid channel and fluidly coupled to the first elongated fluid channel; and wherein the vias include (i) multiple first vias extending from the second elongated fluid channel and (ii) multiple second vias extending from the third elongated fluid channel.

10. The system of claim 9, wherein the one or more side walls are integral with the housing.

11. The system of claim 9, wherein the cover lid is permanently affixed to the one or more side walls.

12. The system of claim 9, wherein the vias are positioned to permit a coolant fluid to exit the cavity and strike the one or more targeted portions of the electric motor.

13. The system of claim 9, wherein the vias are configured to permit a coolant fluid to exit the cavity and strike the one or more targeted portions of the electric motor regardless of a fluid pressure within the cavity.

14. The system of claim 9, wherein the vias are patterned in at least one of:
multiple straight lines; and
an "M"-shaped pattern.

15. The system of claim 9, further comprising:
a pump configured to direct a coolant fluid into the manifold.

16. The system of claim 15, wherein the pump is configured to vary a pressure of the coolant fluid within the manifold.

17. The system of claim 9, wherein at least some of the vias are spaced apart to create a rainfall pattern of coolant over the electric motor.

18. A method comprising:
forming a housing configured to receive at least a portion of an electric motor, the housing comprising multiple elongated fluid channels on an upper surface of the housing, the elongated fluid channels defined by one or more side walls extending from the upper surface of the housing;
forming multiple jets, the jets comprising vias extending between (i) at least some of the elongated fluid channels and (ii) an interior portion of the housing; and
coupling a cover lid to the one or more side walls to form a manifold on the upper surface of the housing;
wherein the elongated fluid channels include (i) a first elongated fluid channel and (ii) second and third elongated fluid channels extending from the first elongated fluid channel and fluidly coupled to the first elongated fluid channel; and
wherein the vias include (i) multiple first vias extending from the second elongated fluid channel and (ii) multiple second vias extending from the third elongated fluid channel.

19. The method of claim 18, wherein the cover lid is permanently affixed to the one or more side walls.

20. The method of claim 18, wherein at least some of the jets are spaced apart to create a rainfall pattern of coolant over the electric motor.

21. The method of claim 18, wherein coupling the cover lid comprises friction stir welding the cover lid to the one or more side walls.

22. The method of claim 18, wherein the jets permit a coolant fluid to exit at least some of the fluid channels and strike one or more targeted portions of the electric motor regardless of a fluid pressure within the fluid channels.

* * * * *